US012081479B2

(12) United States Patent
Zewail et al.

(10) Patent No.: US 12,081,479 B2
(45) Date of Patent: Sep. 3, 2024

(54) PTRS RESOURCE DENSITY RECOMMENDATION AND SELECTION TECHNIQUES

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Zhifei Fan, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 410 days.

(21) Appl. No.: 17/318,855

(22) Filed: May 12, 2021

(65) Prior Publication Data

US 2021/0359818 A1    Nov. 18, 2021

Related U.S. Application Data

(60) Provisional application No. 63/024,293, filed on May 13, 2020.

(51) Int. Cl.
*H04L 5/00* (2006.01)
*H04B 7/01* (2006.01)
(Continued)

(52) U.S. Cl.
CPC ............. *H04L 5/0051* (2013.01); *H04B 7/01* (2013.01); *H04L 1/0026* (2013.01); *H04L 1/203* (2013.01); *H04L 27/2613* (2013.01)

(58) Field of Classification Search
CPC ..... H04L 5/0051; H04L 1/0026; H04L 1/203; H04L 27/613; H04B 7/01
See application file for complete search history.

(56) References Cited

U.S. PATENT DOCUMENTS

2018/0205528 A1* 7/2018 Bai .................. H04L 5/0092
2018/0323933 A1* 11/2018 Nam ................ H04W 72/12
(Continued)

FOREIGN PATENT DOCUMENTS

WO    WO-2019098938 A1    5/2019

OTHER PUBLICATIONS

International Search Report and Written Opinion—PCT/US2021/032261—ISA/EPO—Aug. 17, 2021.
(Continued)

*Primary Examiner* — Walter J Divito
(74) *Attorney, Agent, or Firm* — Arun Swain

(57) ABSTRACT

Wireless communication techniques that include PTRS resource density recommendation and selection techniques are discussed. A UE may transmit to a base station a set of phase tracking reference signal (PTRS) resource density recommendations that are determined based, at least in part, on a block error rate (BLER). The base station may transmit to the UE an indication of PTRS resource densities to use for wireless communication of the PTRS based, at least in part, on the BLER associated with the received set of PTRS resource density recommendations. The base station and/or the UE may at least one of receive or transmit a PTRS based, at least in part, on the indicated PTRS resource densities. Other aspects and features are also claimed and described.

28 Claims, 6 Drawing Sheets

(51) Int. Cl.
*H04L 1/00* (2006.01)
*H04L 1/20* (2006.01)
*H04L 27/26* (2006.01)

(56) References Cited

U.S. PATENT DOCUMENTS

2020/0052861 A1* 2/2020 Li ............................ H04L 1/0026
2020/0077419 A1* 3/2020 Lee .......................... H04L 5/0041
2021/0050965 A1* 2/2021 Wu .......................... H04L 5/0051

OTHER PUBLICATIONS

LG Electronics: "Discussion on Common Phase Error Compensation for Above 6GHz", 3GPP Draft, 3GPP TSG RAN WG1 Meeting #86bis, R1-1609261, Discussion on Common Phase Error Compensation for Above 6GHz, 3rd Generation Partnership Project (3GPP), Mobile Competence Centre, 650, Route Des Lucioles, F-06921 Sophia-Anti, vol. RAN WG1, No. Lisbon, Portugal, Oct. 10, 2016-Oct. 14, 2016, Oct. 9, 2016 (Oct. 9, 2016), XP051149307, 11 Pages, Retrieved from the Internet: URL: http://www.3gpp.org/ftp/Meetings_3GPP_SYNC/RAN1/Docs/. [Retrieved on Oct. 9, 2016] Section 3.

Samsung: "Remaining Issues on PT-RS Density", 3GPP Draft, 3GPP TSG RAN WG1 NR Ad-hoc#2, R1-1711599, Remaining Issues on PT-RS Density, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051300773, 3 Pages, Retrieved from the Internet: URL: http://www.3gpp.org/ftp/Meetings_3GPP_SYNC/RAN1/Docs/. [Retrieved on Jun. 26, 2017] Section 2.

\* cited by examiner

PTRS RESOURCE DENSITY RECOMMENDATION AND SELECTION TECHNIQUES

CROSS-REFERENCE TO RELATED APPLICATIONS

This application claims the benefit of and priority to U.S. Provisional Patent Application No. 63/024,293, entitled "PTRS RESOURCE DENSITY RECOMMENDATION AND SELECTION TECHNIQUES," filed on May 13, 2020, which is expressly incorporated herein by reference as if fully set forth below in its entirety and for all applicable purposes.

TECHNICAL FIELD

Aspects of the present disclosure relate generally to wireless communication systems, and more particularly, to phase tracking reference signal (PTRS) resource density recommendation and selection techniques in wireless communication systems. Certain embodiments of the technology discussed below can enable and provide enhanced communication features and techniques for communication systems, including higher data rates, higher capacity, higher performance, better spectral efficiency, higher reliability, higher mobility, lower memory usage, and lower power device operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication at a user equipment (UE) is provided. For example, a method can include transmitting a set of phase tracking reference signal (PTRS) resource density recommendations that are determined based, at least in part, on a block error rate (BLER). The method can also include receiving an indication of PTRS resource densities to use for wireless communication of the PTRS, wherein the transmitted set of PTRS resource density recommendations includes the indicated PTRS resource densities. The method can further include at least one of receiving or transmitting a PTRS based, at least in part, on the indicated PTRS resource densities.

In another aspect of the disclosure, an apparatus configured for wireless communication is provided. For example, the apparatus can include means for transmitting a set of PTRS resource density recommendations that are determined based, at least in part, on a BLER. The apparatus may also include means for receiving an indication of PTRS resource densities to use for wireless communication of the PTRS, wherein the transmitted set of PTRS resource density recommendations includes the indicated PTRS resource densities. The apparatus can further include means for at least one of receiving or transmitting a PTRS based, at least in part, on the indicated PTRS resource densities.

In an additional aspect of the disclosure, a non-transitory computer-readable medium having program code recorded thereon is provided. The program code can include program code executable by a computer for causing the computer to transmit a set of PTRS resource density recommendations that are determined based, at least in part, on a BLER. The program code can also include program code executable by the computer for causing the computer to receive an indication of PTRS resource densities to use for wireless communication of the PTRS, wherein the transmitted set of PTRS resource density recommendations includes the indicated PTRS resource densities. The program code can further include program code executable by the computer for causing the computer to at least one of receive or transmit a PTRS based, at least in part, on the indicated PTRS resource densities.

In another aspect of the disclosure, an apparatus configured for wireless communication is provided. The apparatus includes at least one processor, and a memory coupled to the processor. The at least one processor can be configured to transmit a set of PTRS resource density recommendations that are determined based, at least in part, on a BLER. The at least on processor can also be configured to receive an indication of PTRS resource densities to use for wireless communication of the PTRS, wherein the transmitted set of PTRS resource density recommendations includes the indicated PTRS resource densities. The at least on processor can be further configured to at least one of receiving or transmitting a PTRS based, at least in part, on the indicated PTRS resource densities.

In one aspect of the disclosure, a method of wireless communication at a base station is provided. For example, a method can include receiving a set of PTRS resource density recommendations that are determined based, at least in part, on a BLER. The method may also include transmitting an indication of PTRS resource densities to use for wireless communication of the PTRS based, at least in part, on the BLER associated with the received set of PTRS resource density recommendations, wherein the received set of PTRS resource density recommendations includes the indicated PTRS resource densities. The method may further include at least one of receiving or transmitting a PTRS based, at least in part, on the indicated PTRS resource densities.

In another aspect of the disclosure, an apparatus configured for wireless communication is provided. For example, the apparatus can include means for receiving a set of PTRS resource density recommendations that are determined based, at least in part, on a BLER. The apparatus can also include means for transmitting an indication of PTRS resource densities to use for wireless communication of the PTRS based, at least in part, on the BLER associated with the received set of PTRS resource density recommendations, wherein the received set of PTRS resource density recommendations includes the indicated PTRS resource densities. The apparatus can further include means for at least one of receiving or transmitting a PTRS based, at least in part, on the indicated PTRS resource densities.

In an additional aspect of the disclosure, a non-transitory computer-readable medium having program code recorded thereon is provided. The program code can include program code executable by a computer for causing the computer to receive a set of PTRS resource density recommendations that are determined based, at least in part, on a BLER. The program code can also include program code executable by the computer for causing the computer to transmit an indication of PTRS resource densities to use for wireless communication of the PTRS based, at least in part, on the BLER associated with the received set of PTRS resource density recommendations, wherein the received set of PTRS resource density recommendations includes the indicated PTRS resource densities. The program code may further include program code executable by the computer for causing the computer to at least one of receive or transmit a PTRS based, at least in part, on the indicated PTRS resource densities.

In another aspect of the disclosure, an apparatus configured for wireless communication is provided. The apparatus includes at least one processor, and a memory coupled to the processor. The at least one processor can be configured to receive a set of PTRS resource density recommendations that are determined based, at least in part, on a BLER. The at least one processor can also be configured to transmit an indication of PTRS resource densities to use for wireless communication of the PTRS based, at least in part, on the BLER associated with the received set of PTRS resource density recommendations, wherein the received set of PTRS resource density recommendations includes the indicated PTRS resource densities. The at least one processor can be further configured to at least one of receive or transmit a PTRS based, at least in part, on the indicated PTRS resource densities.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1:
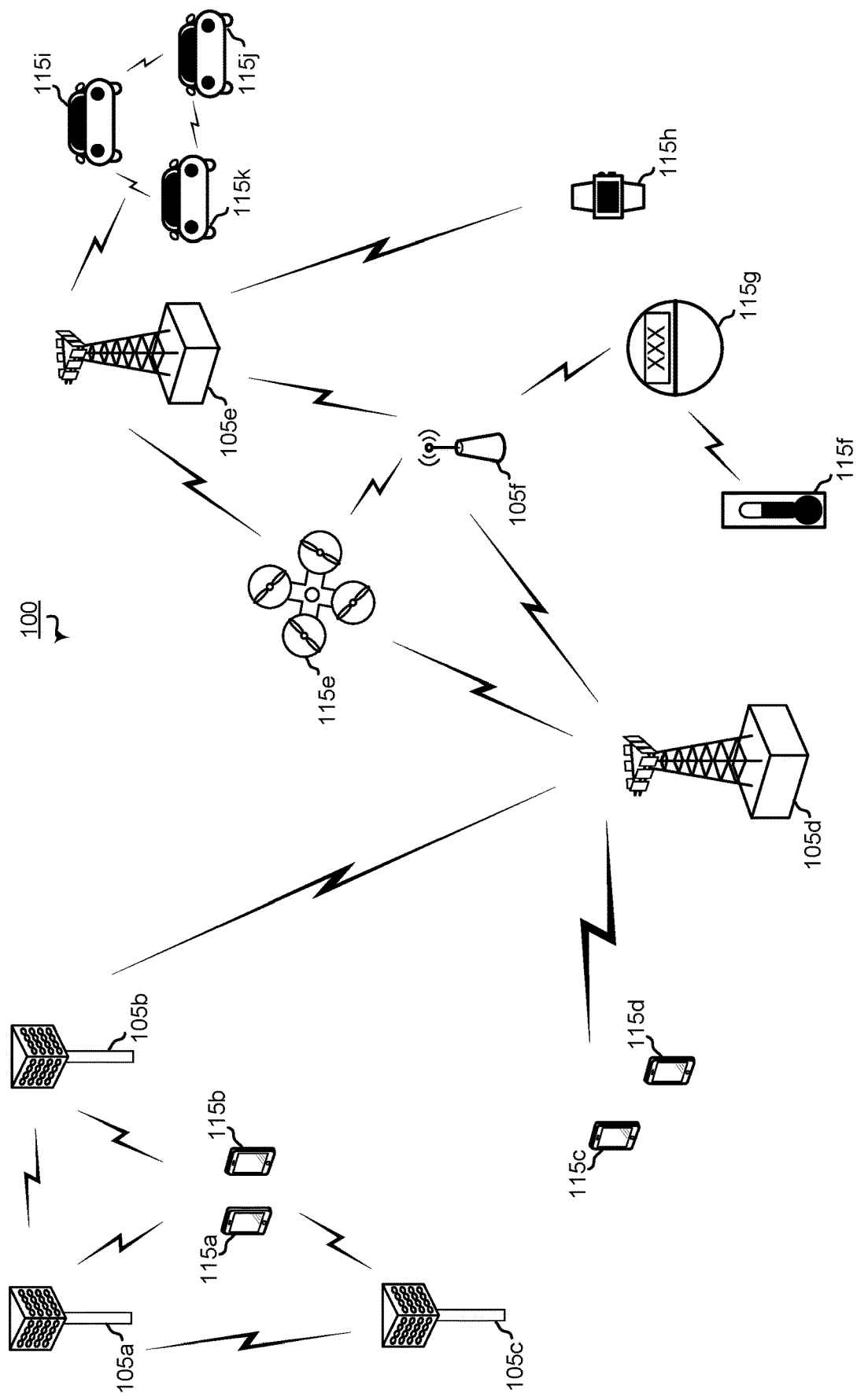
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof, and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
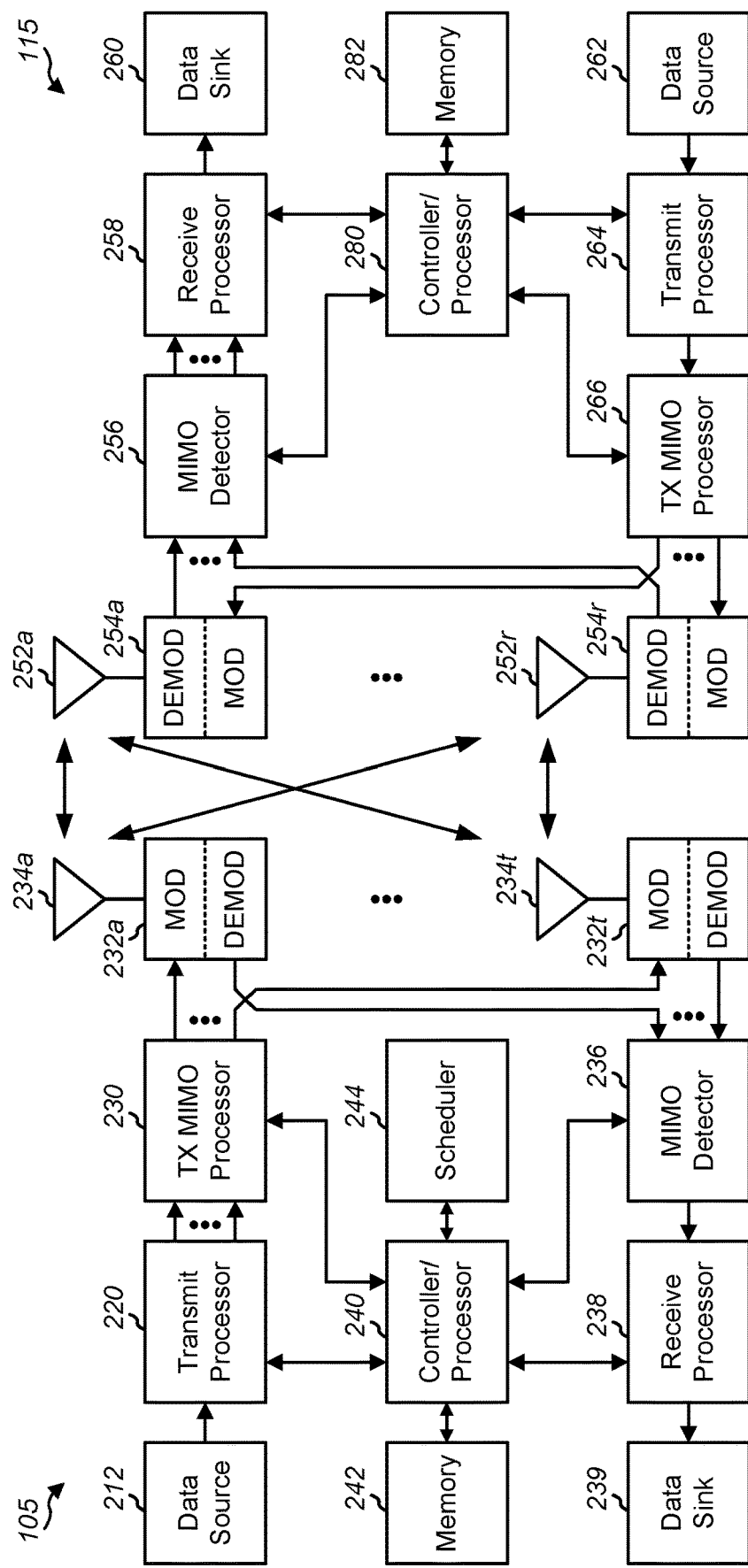
FIG. 2 is a block diagram conceptually illustrating a design of a base station and a UE configured according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/ processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3 and 4, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In some aspects of the disclosure, a UE, such as UE 115, and a base station, such as base station/gNB 105, may use reference signals to guide the transmission, reception, and/or processing of wireless communication between UE 115 and base station 105. Both the UE and base station may transmit and/or receive reference signals from each other.

One type of reference signal that may be used for wireless communication is a phase tracking reference signal (PTRS). In some aspects, PTRSs may be used to compensate for the impact of phase noise on wireless communication. For example, in some aspects, a PTRS may be used to track time and/or frequency shifts of transmitters and/or receivers used for wireless communication.

Figure 3:
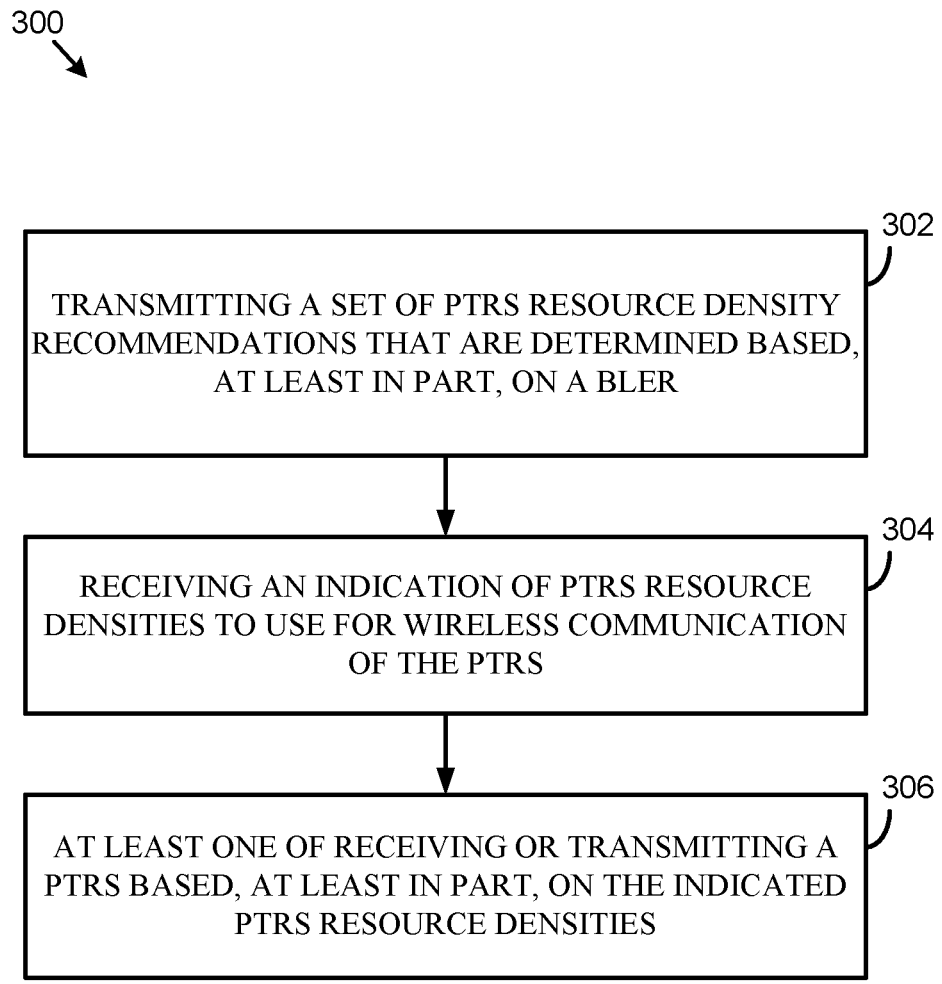
FIG. 3 is a block diagram illustrating a method for PTRS resource density recommendation and selection according to some aspects of the present disclosure.

Aspects of the disclosure may provide enhanced techniques for recommending and selecting PTRS resource densities. FIG. 3, as an example, shows a block diagram illustrating a method for PTRS resource density recommendation and selection according to some aspects of the present disclosure. Aspects of method 300 may be implemented with various other aspects of this disclosure described with respect to FIGS. 1-2 and 5, such as a mobile device/UE. For example, with reference to FIG. 2, controller/processor 280 of UE 115 may control UE 115 to perform method 300.

Figure 5:
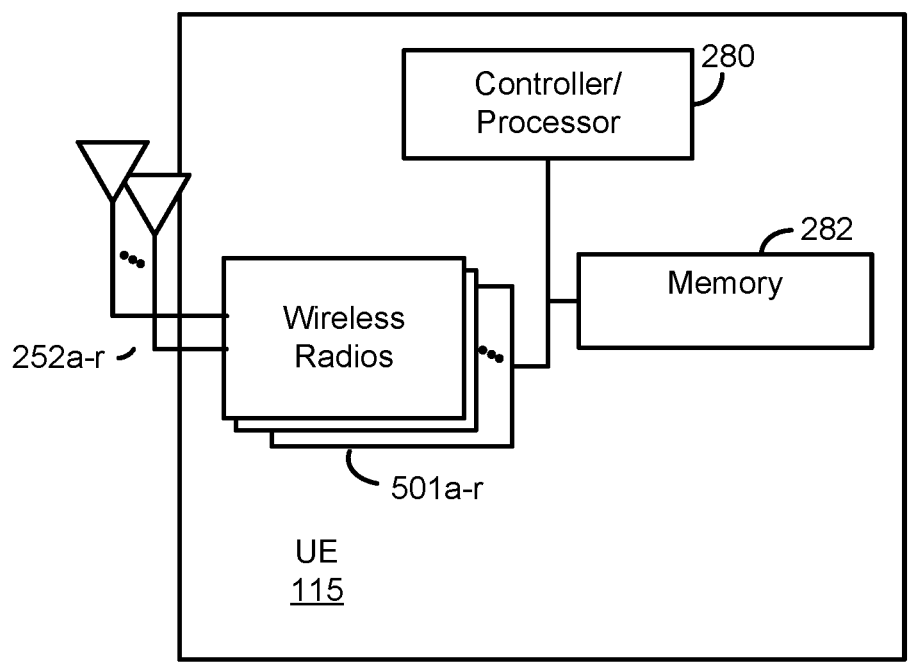
FIG. 5 is a block diagram conceptually illustrating a design of a UE configured according to some aspects of the present disclosure.

The example blocks of method 300 will also be described with respect to UE 115 as illustrated in FIG. 5. FIG. 5 is a block diagram conceptually illustrating a design of a UE configured according to some aspects of the present disclosure. UE 115 may include various structures, hardware, and components, such as those illustrated for UE 115 of FIG. 2. For example, UE 115 includes controller/processor 280, which operates to execute logic or computer instructions stored in memory 282. The controller/processor 280 can also control components of UE 115 that provide the features and functionality of UE 115. UE 115, under control of controller/processor 280, transmits and receives signals via wireless radios 501a-r and antennas 252a-r. Wireless radios 501a-r include various components and hardware, as illustrated in FIG. 2 for UE 115, including modulator/demodulators 254a-r, MIMO detector 256, receive processor 258, transmit processor 264, and TX MIMO processor 266. The controller/processor 280 can be provided with digital signals obtained from sampling received analog wireless signals for purposes of controlling communication operations.

FIG. 3 illustrates a method 300 that may be performed by a wireless communication device, such as a UE 115. Method 300 includes, at block 302, a UE transmitting a set of PTRS resource density recommendations that are determined based, at least in part, on a block error rate (BLER). Similarly, as described below with respect to FIG. 4, a base station, such as a gNB 105, may receive a set of PTRS resource density recommendations that are determined based, at least in part, on a BLER.

In some aspects, a base station may configure PTRSs to be transmitted and/or received by a UE and/or the base station in certain resources of a wireless communication system. According to some aspects, a resource for wireless communication may refer to a resource element (RE) or a group of resource elements. A single RE may correspond to a smallest unit of a frequency and time period combination of a wireless communication system that can be allocated, e.g., mapped, for transmission and/or reception of information, such as a PTRS. For example, in some aspects, a RE may correspond to a single subcarrier associated with a wireless communication system. Additionally, a RE may correspond to a time period of a single symbol associated with a wireless communication system. In other words, a "symbol" may refer to a smallest time period that may be allocated for transmission and/or reception of information, such as a PTRS. In some aspects, a group of REs along the frequency domain, e.g., a group of subcarriers, may be referred to as a resource block (RB). In additional aspects, a group of REs along the time domain, e.g., a group of symbols, may be referred to as a slot.

According to some aspects, a UE may provide a base station with recommendations for how to allocate the PTRS to wireless communication resources. As an example, a UE may provide PTRS resource density recommendations to a base station. For example, in some aspects, a UE may transmit to a base station frequency density recommendations for how to configure the density of the PTRS along frequency resources, e.g., along subcarriers or RBs. For example, PTRS frequency density recommendations may recommend that a PTRS be included every second subcarrier or RB, every fourth subcarrier or RB, etc. In additional aspects, a UE may also transmit to a base station time density recommendations for how to configure the density of the PTRS along time resources, e.g., along symbols or slots. For example, PTRS time density recommendations may recommend that a PTRS be included every symbol or slot, every second symbol or slot, every fourth symbol or slot, etc. In still additional aspects, a UE may also transmit to a base station PTRS sample density recommendations. For example, a UE may transmit to a base station a PTRS sample density recommendation when transform precoding is enabled at the base station and/or the UE. In some aspects, the UE may transmit the PTRS resource density recommendations to the base station as one or more sets, e.g., groups, of recommendations. According to some aspects, each set of PTRS resource density recommendations may include at least one recommendation for each of at least one of a frequency density, a time density, or a sample density.

Typically, the PTRS resource density recommendations provided to the base station by the UE may be based on subcarrier spacing. For example, for each distinct subcarrier spacing, the UE may provide the base station with a distinct set of PTRS resource density recommendations. However, providing PTRS resource density recommendations based on only subcarrier spacing yields unfavorable operations in some instances.

In some aspects of this disclosure, e.g., as described at block 302 of FIG. 3, enhanced wireless communication features may be achieved by determining the PTRS resource density recommendations based on a BLER. A BLER may refer to a ratio of the number of erroneous blocks to the total number of transmitted blocks. Different BLER requirements may be associated with different wireless communication services or with different types of wireless communication schemes. For example, a target BLER for ultra-reliable low-latency communication (URLLC) may be 1%. Yet, a target BLER for enhanced mobile broadband (eMBB) communication may be 10%.

According to aspects of this disclosure, a UE may determine each of the PTRS resource density recommendations based on a target BLER. In other words, each recommendation in a set of PTRS resource density recommendations, e.g., a frequency, time, and/or sample density recommendation, transmitted by a UE to a base station may be determined by the UE based on a target BLER in addition to the used subcarrier spacing and operating band. For example, for a first target BLER, such as a target BLER of 1%, a UE may recommend a first PTRS time density. In some aspects of the disclosure, multiple time densities may be sufficient to meet a particular BLER. For example, for a second target BLER, such as a target BLER of 10%, a UE may recommend a second PTRS time density and/or a third PTRS time density. According to some aspects of the disclosure, the second or third recommended PTRS time density may be the same as the first recommended PTRS time density. Similarly, for a first target BLER, such as a target BLER of 1%, a UE may recommend a first PTRS frequency density. In some aspects of the disclosure, multiple frequency densities may be sufficient to meet a particular BLER. For example, for a second target BLER, such as a target BLER of 10%, a UE may recommend a second PTRS frequency density and/or a third PTRS frequency density. According to some aspects of the disclosure, the second or third recommended PTRS frequency density may be the same as the first recommended PTRS frequency density. Additionally, for a first target BLER, such as a target BLER of 1%, a UE may recommend a first PTRS sample density. According to some aspects, the time and frequency densities may be defined for both uplink and downlink transmission of the PTRS, while the sample density may be defined for uplink transmission of the PTRS when transform precoding, such as Discrete Fourier Transform-spread (DFT-S), is enabled at the base station and/or the UE. In some aspects of the disclosure, multiple sample densities may be sufficient to meet a particular BLER. For example, for a second target BLER, such as a target BLER of 10%, a UE may recommend a second PTRS sample density and/or a third PTRS sample density. According to some aspects of the disclosure, the second or third recommended PTRS sample density may be the same as the first recommended PTRS sample density.

According to some aspects, a base station may request that a UE provide sets of PTRS resource density recommendations for one or more BLERs. For example, in some aspects, a base station may transmit to a UE an indication of one or more BLERs for which the base station may want the UE to provide PTRS resource density recommendations. A UE may determine PTRS resource densities that are sufficient to meet each of the one or more BLERs specified by the base station. Accordingly, in some aspects, the set of PTRS resource density recommendations that a UE transmits to a base station, as described at block 302 of FIG. 3, may be determined based on a BLER that was previously specified by the base station. In particular, as mentioned above, in some aspects, a UE may have previously received from a base station an indication of the BLER that is associated with the set of PTRS resource density recommendations. In other words, the PTRS resource density recommendations that are part of the set of PTRS resource density recommendations that the UE transmits to the base station, as described at block 302 of FIG. 3, may have been determined based, at least in part, on the indicated BLER that was previously received by the UE from the base station.

In some aspects, a UE may transmit multiple sets of PTRS resource density recommendations to a base station. Some sets of PTRS resource density recommendations may be associated with the same BLER and some sets of PTRS resource density recommendations may be associated with different BLERs. For example, in some aspects, in addition to the set of PTRS resource density recommendations that the UE transmits to the base station, such as at block 302 of FIG. 3, the UE may also transmit to the base station a second set of PTRS resource density recommendations that are determined based on a second BLER, such as a BLER that is different than the BLER used to transmit the set of PTRS resource density recommendations mentioned at block 302 of FIG. 3.

In some aspects of this disclosure, the set of PTRS resource density recommendations may also be determined based on a Doppler effect. In other words, each recommendation in a set of PTRS resource density recommendations, e.g., a frequency, time, and/or sample density recommendation, transmitted by a UE to a base station may be determined by the UE based on a Doppler effect in addition to being determined based on a target BLER. For example, a UE may calculate one or more Doppler values that are indicative of the impact of Doppler on wireless communication based on channel estimation techniques. A UE may then determine one or more PTRS resource density recommendations for each different Doppler value or for each different range of Doppler values. In other words, a UE may determine one or more PTRS resource densities to recommend to a base station based on a calculated Doppler value or a range of calculated Doppler values. In some aspects, some of the PTRS resource densities that may be recommended by a UE to a bases station based on Doppler effects may be different for different Doppler values or different ranges of Doppler values. In additional aspects, some of the PTRS resource densities that may be recommended by a UE to a bases station based on Doppler effects may be the same for different Doppler values or different ranges of Doppler values.

According to some aspects, determining sets of PTRS resource density recommendations based on BLERs and Doppler effects may make the sets of PTRS resource density recommendations determined by a UE two-dimensional. For example, for a first target BLER, such as a target BLER of 1%, a UE may also determine two Doppler values, such as a first Doppler value and a second Doppler value, that are indicative of two different impacts of Doppler on wireless communication. In some aspects, for a first combination of a target BLER and Doppler value, such as a combination that includes the first target BLER of 1% and the first Doppler value, a UE may recommend a first PTRS time density, frequency density, and/or sample density. Similarly, for a second combination of a target BLER and Doppler value, such as a combination that includes the first target BLER of 1% and the second Doppler value, a UE may recommend a second PTRS time density, frequency density, and/or sample density. In some aspects of the disclosure, multiple PTRS resource densities, whether a frequency density, time density, or a sample density, may be sufficient to meet a particular combination of a target BLER and Doppler value. For example, for the second combination of a target BLER and Doppler value that includes the first target BLER of 1% and the second Doppler value, a UE may also recommend a third PTRS time density, frequency density, and/or sample density.

Returning to FIG. 3, method 300 also includes, at block 304, a UE receiving an indication of PTRS resource densities to use for wireless communication of the PTRS. Similarly, as described below with respect to FIG. 4, a base station, such as a gNB 105, may transmit an indication of PTRS resource densities to use for wireless communication of the PTRS. In some aspects of the disclosure, the set of PTRS resource density recommendations transmitted by the UE to the base station, as shown at block 302 of FIG. 3, may include the indicated PTRS resource densities that the UE receives from the base station, as shown at block 304 of FIG. 3.

In some aspects, the indication of PTRS resource densities to use for wireless communication of the PTRS may inform the UE of the PTRS configuration selected by the base station for transmission and/or reception of the PTRS by the UE and/or the base station, e.g., during downlink communication and/or during uplink communication. For example, in some aspects, the indication of PTRS resource densities transmitted by the base station to the UE may include a PTRS frequency density indication indicating that the PTRS should be transmitted and/or received in every second subcarrier or RB, every fourth subcarrier or RB, etc. In additional aspects, the indication of PTRS resource densities transmitted by the base station to the UE may also include a PTRS time density indication indicating that the PTRS should be transmitted and/or received in every symbol or slot, every second symbol or slot, every fourth symbol or slot, etc. In still additional aspects, the indication of PTRS resource densities transmitted by the base station to the UE may also include a PTRS sample density indication. According to some aspects, the set of PTRS resource density recommendations received by the base station from the UE may include the indicated PTRS resource densities that the base station transmits to the UE. In other words, in some aspects, the PTRS resource densities selected by the base station for wireless communication of the PTRS may be selected from the PTRS resource densities recommended by the UE.

In some aspects, a UE may inform the base station of the association between BLERs and recommended PTRS resource densities. In other words, a UE may transmit to a base station, and the base station may receive from the UE, an indication of at least one BLER associated with the set of PTRS resource density recommendations sent by the UE to the base station. For example, in some aspects, a UE may transmit to a base station an index that maps sets of PTRS resource density recommendations sent by the UE to the base station to a predefined table of BLER requirements. As an example, a first row of the predefined table may include recommended PTRS resource densities for meeting a 10% BLER and a second row of the predefined table may include recommended PTRS resource densities for meeting a 10^-5 BLER. According to some aspects, the index may be transmitted by the UE to the base station along with the set of PTRS resource density recommendations transmitted by the UE to the base station. In some aspects, the UE may signal the base station for using a specific set of recommendations via downlink control information (DCI) or a medium access control (MAC) control element (MAC-CE).

According to some aspects of the disclosure, the base station may determine the indicated PTRS resource densities based on the BLER associated with the received set of PTRS resource density recommendations. For example, in some aspects, a base station may determine a target BLER for wireless communication, which may be uplink and/or downlink wireless communication. Based on the determined target BLER, the base station may select PTRS resource densities (e.g., frequency, time, and/or sample resource densities) that are sufficient to achieve the target BLER. For example, for a specific target BLER, the base station may select the PTRS resource densities to use for wireless communication of the PTRS from the PTRS resource densities recommended to the base station by the UE based on the UE's determination of those PTRS resource density recommendations based on the target BLER. In other words, the base station may select as the PTRS resource densities to use for wireless communication the PTRS resource densities recommended by the UE based on their association with the target BLER, e.g., those recommended PTRS resource densities are determined by the UE to be sufficient to meet a specific target BLER. The base station may then send an indication of the selected PTRS resource densities to the UE to inform the UE of the PTRS configuration selected by the base station for transmission and/or reception of the PTRS by the UE and/or the base station.

A base station may determine a target BLER based on various factors. In some aspects, the base station may determine the target BLER based on a type of service and/or scheme to be used for wireless communication. For example, when the base station determines that a first service or scheme will be used for wireless communication, the base station may determine the target BLER to be the BLER associated with that first service or scheme. And when the base station determines that a second (different) service or scheme will be used for wireless communication, the base station may determine the target BLER to be the BLER associated with that second service or scheme. As a specific example, a target BLER for URLLC may be 1%, and a target BLER for eMBB communication may be 10%. Thus, when the base station determines that URLLC will be used for communication between the UE and the base station, the base station may select 1% as the target BLER.

According to some aspects, a base station may also determine the target BLER based on a channel quality indicator (CQI) table to be used by the UE for reporting channel quality information. For example, when the base station determines that a first CQI table should be used by the UE for reporting channel quality information, the base station may determine the target BLER to be the BLER associated with that first CQI table. And when the base station determines that a second (different) CQI table should be used by the UE for reporting channel quality information, the base station may determine the target BLER to be the BLER associated with that second CQI table. As a specific example, a target BLER associated with a first and/or second CQI table may be 10%, and a target BLER for a third CQI table may be $10^{-5}$.

In some aspects, the indication of PTRS resource densities to use for wireless communication of the PTRS may include an explicit indication of the PTRS resource densities to use for wireless communication of the PTRS. For example, as mentioned above, a UE may inform the base station of the association between BLERs and recommended PTRS resource densities. In some aspects, when the base station determines a target BLER for wireless communication, the base station may indicate to the UE the specific PTRS resource densities that should be used for wireless communication of the PTRS based on the association between BLERs and recommended PTRS resource densities that the UE provided to the base station. In other aspects, a base station may know the association between PTRS resource densities and BLERs without being informed of such an association by the UE. In such aspects, when the base station determines a target BLER for wireless communication, the base station may indicate to the UE the specific PTRS resource densities that should or will be used for wireless communication of the PTRS based on the association between BLERs and PTRS resource densities known by the base station.

According to some aspects, the indication of PTRS resource densities to use for wireless communication of the PTRS may include an implicit indication of the PTRS resource densities to use for wireless communication of the PTRS. For example, a base station may transmit an indication of a particular wireless communication configuration to the UE and the UE may use the configuration to determine the specific PTRS resource densities for wireless communication of a PTRS. For example, in some aspects, the indication of PTRS resource densities to use for wireless communication of the PTRS, e.g., the indication that is transmitted from the base station to the UE, may include an indication of a CQI table to be used by the UE for reporting channel quality information. According to some aspects, the UE may be aware of BLERs associated with different CQI tables. Thus, when the UE receives an indication that a first CQI table is to be used by the UE for reporting channel quality information, the UE may determine that the target BLER to be used for wireless communication is the BLER associated with that specific first CQI table. And when the UE receives another indication that a second CQI table is to be used by the UE for reporting channel quality information, the UE may determine that the target BLER to be used for wireless communication is the BLER associated with that specific second CQI table. In some aspects, the UE may already be aware of which PTRS resource densities are associated with which BLERS. Thus, when the UE determines the target BLER to be used for wireless communication, the UE may determine the PTRS resource densities to be used for wireless communication of the PTRS to be the PTRS resource densities associated with the target BLER that was determined based on the received indication of the CQI table to be used by the UE for reporting channel quality information. In other words, the UE may determine the PTRS resource densities based on the indication of a CQI table to be used by the UE for reporting channel quality information as a result of the association between CQI tables and BLERs and the association between BLERs and PTRS resource densities. According to some aspects, other tables, such as modulation and coding scheme (MCS) tables, may be used to configure a UE, and the UE may implicitly determine the PTRS resource densities to be used for wireless communication of PTRSs based on the indicated tables.

According to some aspects of the disclosure, the implicit indication of PTRS resource densities to use for wireless communication of the PTRS may be an indication of a type of service and/or scheme to be used for wireless communication. For example, the indication of PTRS resource densities to use for wireless communication of the PTRS, e.g., the indication that is transmitted from the base station to the UE, may include an indication of a type of service and/or scheme to be used for wireless communication. According to some aspects, the UE may be aware of BLERs associated with different wireless communication services or schemes. Thus, when the UE receives an indication that a first service or scheme will be used for wireless communication, the UE may determine that the target BLER to be used for wireless communication is the BLER associated with that specific first service or scheme. And when the UE receives another indication that a second service or scheme will be used for wireless communication, the UE may determine that the target BLER to be used for wireless communication is the BLER associated with that specific second service or scheme. In some aspects, the UE may already be aware of which PTRS resource densities are associated with which BLERS. Thus, when the UE determines the target BLER to be used for wireless communication, the UE may determine the PTRS resource densities to be used for wireless communication of the PTRS to be the PTRS resource densities associated with the target BLER that was determined based on the received indication of the wireless communication service or scheme. In other words, the UE may determine the PTRS resource densities based on the indication of a wireless communication service or scheme as a result of the association between wireless schemes/services and BLERs and the association between BLERs and PTRS resource densities.

In another aspect of the disclosure, the implicit indication of PTRS resource densities to use for wireless communication of the PTRS may be a priority indication in the DCI. For example, when a UE receives from the base station a priority indication indicating that a certain wireless communication service is a high priority wireless communication service, the UE may determine that PTRS resource densities associated with a low BLER value, such as 1%, 0.1%, or 10^-5, should be used for wireless communication of a PTRS.

In some aspects, a base station may determine the PTRS resource densities to use for wireless communication of the PTRS based on additional information received from the UE. For example, according to some aspects, a UE may transmit to a base station an indication of the specific PTRS resource densities to use for wireless communication of the PTRS. In additional aspects, the set of PTRS resource density recommendations that the UE transmits to the base station may include the indicated specific PTRS resource densities. In such aspects, the indication of PTRS resource densities to use for wireless communication of the PTRS that is transmitted from the base station to the UE, such as at block 304 of FIG. 3, may correspond to the indication of the specific PTRS resource densities that the base station receives from the UE.

In some aspects of this disclosure, a base station may determine the indication of PTRS resource densities to use for wireless communication of the PTRS, such as the indication transmitted to a UE, based on a Doppler effect associated with the received set of PTRS resource density recommendations. In other words, each indication of a PTRS resource density, e.g., a frequency, time, and/or sample density, transmitted by a base station to a UE may be determined by the base station based on a Doppler effect in addition to being determined based on a target BLER. For example, a base station may calculate one or more Doppler values that are indicative of the impact of Doppler on wireless communication based on channel estimation techniques. A base station may then determine one or more PTRS resource densities for each different Doppler value or for each different range of Doppler values. In other words, a base station may determine one or more PTRS resource densities based on a calculated Doppler value or a range of calculated Doppler values. In some aspects, some of the PTRS resource densities may be different for different Doppler values or different ranges of Doppler values. In additional aspects, some of the PTRS resource densities may be the same for different Doppler values or different ranges of Doppler values. According to some aspects, determining PTRS resource densities based on BLERs and Doppler effects may make the selection of PTRS resource densities by a base station more robust.

Returning to FIG. 3, method 300 also includes, at block 306, a UE at least one of receiving or transmitting a PTRS based, at least in part, on the indicated PTRS resource densities. Similarly, as described below with respect to FIG. 4, a base station, such as a gNB 105, may at least one of receiving or transmitting a PTRS based, at least in part, on the indicated PTRS resource densities.

Figure 4:
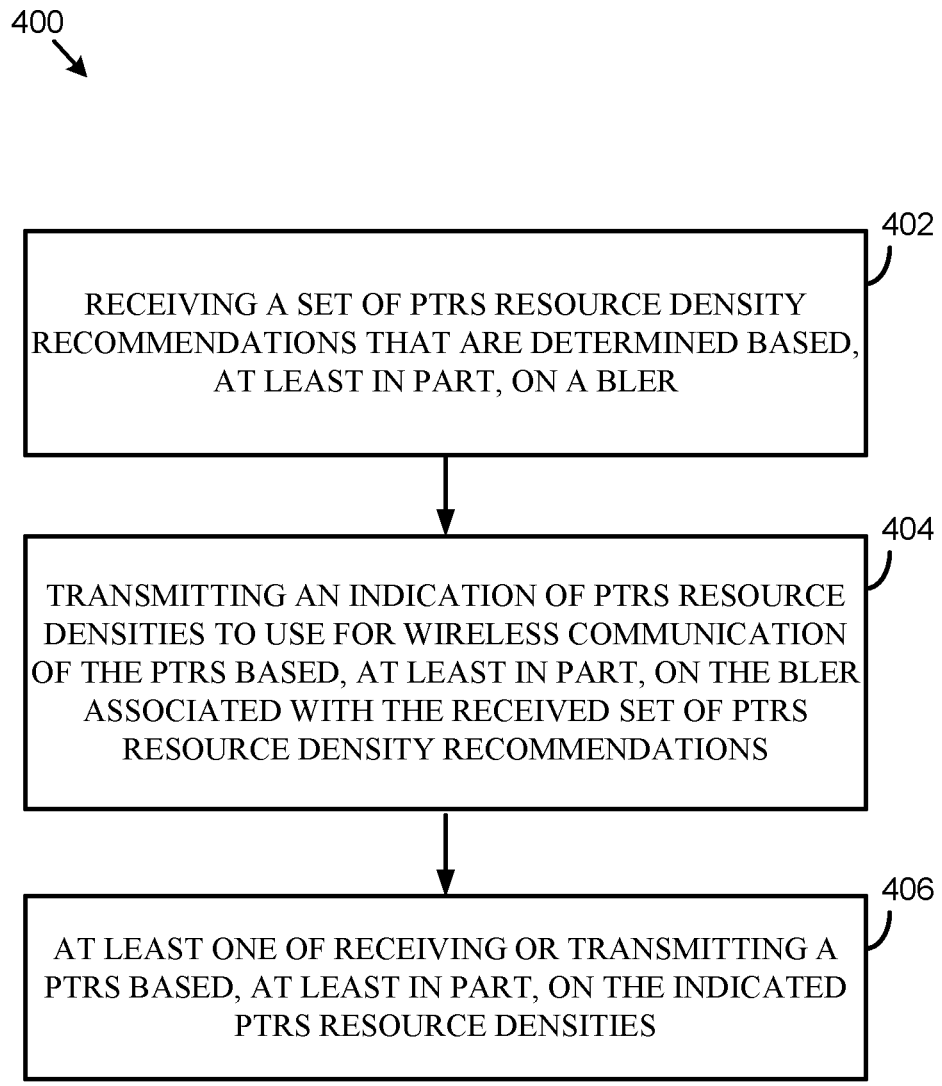
FIG. 4 is another block diagram illustrating another method for PTRS resource density recommendation and selection according to some aspects of the present disclosure.

FIG. 4, as an example, shows another block diagram illustrating another method for PTRS resource density recommendation and selection according to some aspects of the present disclosure. Aspects of method 400 may be implemented with various other aspects of this disclosure described with respect to FIGS. 1-2 and 6, such as a base station/gNB. For example, with reference to FIG. 2, controller/processor 240 of base station 105 may control base station 105 to perform method 400.

Figure 6:
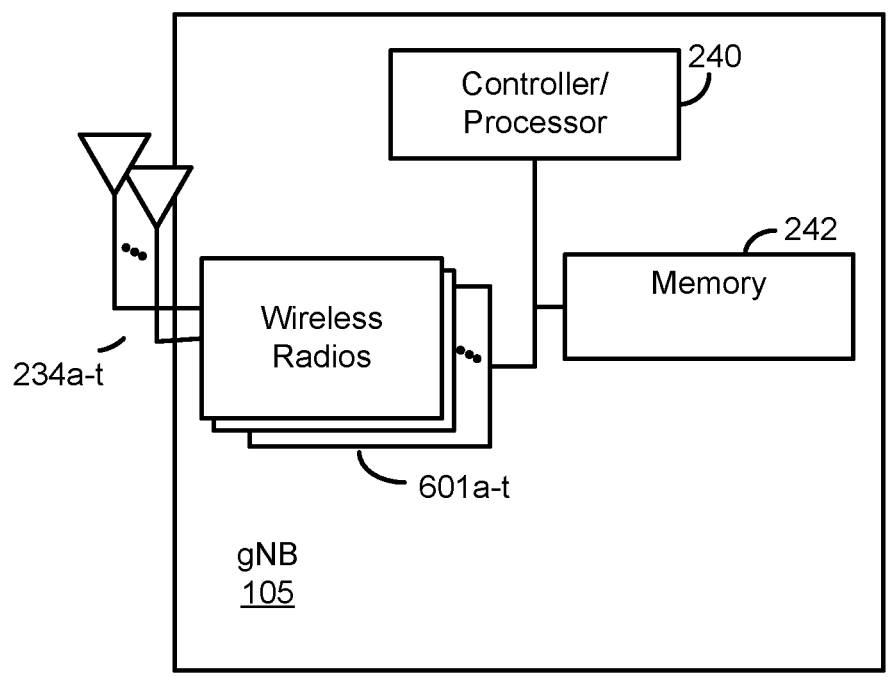
FIG. 6 is a block diagram conceptually illustrating a design of a base station (e.g., a gNB) configured according to some aspects of the present disclosure.

The example blocks of method 400 will also be described with respect to base station 105 as illustrated in FIG. 6. FIG. 6 is a block diagram conceptually illustrating a design of a base station (e.g., a gNB) configured according to some aspects of the present disclosure. Base station 105 may include various structures, hardware, and components, such as those illustrated for base station 105 of FIG. 2. For example, base station 105 includes controller/processor 240, which operates to execute logic or computer instructions stored in memory 242. The controller/processor 240 can also control components of base station 105 that provide the features and functionality of base station 105. Base station 105, under control of controller/processor 240, transmits and receives signals via wireless radios 601a-t and antennas 234a-t. Wireless radios 601a-t include various components and hardware, as illustrated in FIG. 2 for base station 105, including modulator/demodulators 232a-t, MIMO detector 236, receive processor 238, transmit processor 220, and TX MIMO processor 230. The controller/processor 240 can be provided with digital signals obtained from sampling received analog wireless signals for purposes of controlling communication operations.

FIG. 4 illustrates a method 400 that may be performed by a wireless communication device, such as a gNB 105. Method 400 includes, at block 402, a base station receiving a set of PTRS resource density recommendations that are determined based, at least in part, on a BLER. Method 400 also includes, at block 404, a base station transmitting an indication of PTRS resource densities to use for wireless communication of the PTRS based, at least in part, on the BLER associated with the received set of PTRS resource density recommendations. In some aspects, the received set of PTRS resource density recommendations may include the indicated PTRS resource densities. At block 406, method 400 may include a base station at least one of receiving or transmitting a PTRS based, at least in part, on the indicated PTRS resource densities.

In some aspects, PTRS resource density recommendation and selection techniques may include a UE transmitting, and a base station receiving, a set of PTRS resource density recommendations that are determined based, at least in part, on a BLER. PTRS resource density recommendation and selection techniques may also include a UE receiving an indication of PTRS resource densities to use for wireless communication of the PTRS. PTRS resource density recommendation and selection techniques may also include a base station transmitting an indication of PTRS resource densities to use for wireless communication of the PTRS based, at least in part, on the BLER associated with the received set of PTRS resource density recommendations. In some aspects, the set of PTRS resource density recommendations may include the indicated PTRS resource densities. PTRS resource density recommendation and selection techniques may further include a UE and/or base station at least one of receiving or transmitting a PTRS based, at least in part, on the indicated PTRS resource densities.

PTRS resource density recommendation and selection techniques may include additional aspects, such as any single aspect or any combination of aspects described below and/or in connection with one or more other processes described elsewhere herein.

In a first aspect, the set of PTRS resource density recommendations may include at least one recommendation for each of at least one of a frequency density, a time density, or a sample density.

In a second aspect, alone or in combination with the first aspect, the set of PTRS resource density recommendations may be further determined based, at least in part, on a Doppler effect.

In a third aspect, alone or in combination with one or more of the first and second aspects, the base station may transmit the indication of PTRS resource densities to use for wireless communication of the PTRS based, at least in part, on a Doppler effect associated with the received set of PTRS resource density recommendations.

In a fourth aspect, alone or in combination with one or more of the first through third aspects, a UE may receive, and a base station may transmit, an indication of the BLER associated with the set of PTRS resource density recommendations. In some aspects, the PTRS resource density recommendations may be determined based, at least in part, on the indication of the BLER.

In a fifth aspect, alone or in combination with one or more of the first through fourth aspects, a UE may transmit, and a base station may receive, an indication of specific PTRS resource densities to use for wireless communication of the PTRS. In some aspects, the set of PTRS resource density recommendations may include the specific PTRS resource densities.

In a sixth aspect, alone or in combination with one or more of the first through fifth aspects, the indication of PTRS resource densities to use for wireless communication of the PTRS may include an indication of a CQI table.

In a seventh aspect, alone or in combination with one or more of the first through sixth aspects, the UE may transmit, and a base station may receive, an indication of at least one BLER associated with the set of PTRS resource density recommendations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm processing (e.g., the logical blocks in FIGS. 3 and 4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Features of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A wireless communication method at a user equipment (UE), comprising:
    receiving an indication of one or more block error rates (BLERs);
    transmitting a plurality of sets of phase tracking reference signal (PTRS) resource density recommendations, the plurality of sets of PTRS resource density recommendations including:
        a first set of PTRS resource density recommendations that is determined to be sufficient to meet a first combination of BLER of the one or more BLERs and Doppler value of a plurality of Doppler values; and
        a second set of PTRS resource density recommendations that is determined to be sufficient to meet a second combination of BLER of the one or more BLERs and Doppler value of the plurality of Doppler values;
    receiving an indication of a set of PTRS resource densities to use for wireless communication of a PTRS, wherein the plurality of sets of PTRS resource density recommendations includes the indicated set of PTRS resource densities; and
    at least one of receiving or transmitting the PTRS based, at least in part, on the set of PTRS resource densities.

2. The method of claim 1, wherein the first set of PTRS resource density recommendations and the second set of PTRS resource density recommendations each includes at least one recommendation for each of a frequency density, a time density, and a sample density.

3. The method of claim 1, wherein a first Doppler value of the plurality of Doppler values the first set of PTRS resource density recommendations is determined to be sufficient to meet and a second Doppler value of the plurality of Doppler values the second set of PTRS resource density recommendations is determined to be sufficient to meet are different Doppler values indicative of different impacts of Doppler on the wireless communication.

4. The method of claim 1, wherein the first set of PTRS resource density recommendations and the second set of PTRS resource density recommendations are determined to meet a same BLER of the one or more BLERs.

5. The method of claim 1, further comprising:
    transmitting an indication of specific PTRS resource densities to use for wireless communication of the PTRS, wherein the plurality of sets of PTRS resource density recommendations includes the indication of specific PTRS resource densities.

6. The method of claim 1, wherein the indication of the set of PTRS resource densities to use for wireless communication of the PTRS includes an indication of a channel quality indicator (CQI) table.

7. The method of claim 1, further comprising:
    transmitting an indication of at least one BLER associated with each set of PTRS resource density recommendations of the plurality of sets of PTRS resource density recommendations.

8. An apparatus configured for wireless communication, the apparatus comprising:
    a processing system that includes at least one processor and a memory coupled to the at least one processor, wherein the processing system is configured to cause the apparatus to:
        receive an indication of one or more block error rates (BLERs);
        transmit a plurality of sets of phase tracking reference signal (PTRS) resource density recommendations, the plurality of sets of PTRS resource density recommendations including:
            a first set of PTRS resource density recommendations that is determined to be sufficient to meet a first combination of BLER of the one or more BLERs and Doppler value of a plurality of Doppler values; and
            a second set of PTRS resource density recommendations that is determined to be sufficient to meet a second combination of BLER of the one or more BLERs and Doppler value of the plurality of Doppler values;
        receive an indication of a set of PTRS resource densities to use for wireless communication of a PTRS, wherein the plurality of sets of PTRS resource density recommendations includes the set of PTRS resource densities; and
        at least one of receiving or transmitting the PTRS based, at least in part, on the set of PTRS resource densities.

9. The apparatus of claim 8, wherein the first set of PTRS resource density recommendations and the second set of PTRS resource density recommendations each includes at least one recommendation for each of a frequency density, a time density, and a sample density.

10. The apparatus of claim 8, wherein a first Doppler value of the plurality of Doppler values the first set of PTRS resource density recommendations is determined to be sufficient to meet and a second Doppler value of the plurality of Doppler values the second set of PTRS resource density recommendations is determined to be sufficient to meet are different Doppler values indicative of different impacts of Doppler on the wireless communication.

11. The apparatus of claim 8, wherein the first set of PTRS resource density recommendations and the second set of PTRS resource density recommendations are determined to meet a same BLER of the one or more BLERs.

12. The apparatus of claim 8, wherein the processing system is further configured to cause the apparatus to transmit an indication of specific PTRS resource densities to use for wireless communication of the PTRS, wherein the plurality of sets of PTRS resource density recommendations includes the indication of specific PTRS resource densities.

13. The apparatus of claim 8, wherein the indication of the set of PTRS resource densities to use for wireless communication of the PTRS includes an indication of a channel quality indicator (CQI) table.

14. The apparatus of claim 8, wherein the processing system is further configured to cause the apparatus to transmit an indication of at least one BLER associated with each set of PTRS resource density recommendations of the plurality of sets of PTRS resource density recommendations.

15. A wireless communication method at a base station, comprising:
    transmitting an indication of one or more block error rates (BLERs);
    receiving a plurality of sets of phase tracking reference signal (PTRS) resource density recommendations, the plurality of sets of PTRS resource density recommendations including:
        a first set of PTRS resource density recommendations that is determined to be sufficient to meet a first combination of BLER of the one or more BLERs and Doppler value of a plurality of Doppler values; and
        a second set of PTRS resource density recommendations that is determined to be sufficient to meet a second combination of BLER of the one or more BLERs and Doppler value of the plurality of Doppler values;
    transmitting an indication of a set of PTRS resource densities to use for wireless communication of a PTRS based, at least in part, on a BLER of the one or more BLERs associated with the plurality of sets of PTRS resource density recommendations, wherein the plurality of sets of PTRS resource density recommendations includes the indicated set of PTRS resource densities; and
    at least one of receiving or transmitting the PTRS based, at least in part, on the set of PTRS resource densities.

16. The method of claim 15, wherein the first set of PTRS resource density recommendations and the second set of PTRS resource density recommendations each includes at least one recommendation for each of a frequency density, a time density, and a sample density.

17. The method of claim 15, further comprising:
    transmitting the indication of the set of PTRS resource densities to use for wireless communication of the PTRS based, at least in part, on a Doppler effect associated with the set of PTRS resource density recommendations, wherein a first Doppler value of the plurality of Doppler values the first set of PTRS resource density recommendations is determined to be sufficient to meet and a second Doppler value of the plurality of Doppler values the second set of PTRS resource density recommendations is determined to be sufficient to meet are different Doppler values indicative of different impacts of Doppler on the wireless communication.

18. The method of claim 15, wherein the first set of PTRS resource density recommendations and the second set of PTRS resource density recommendations are determined to meet a same BLER of the one or more BLERs.

19. The method of claim 15, further comprising:
    receiving an indication of specific PTRS resource densities to use for wireless communication of the PTRS, wherein the plurality of sets of PTRS resource density recommendations includes the indication of specific PTRS resource densities.

20. The method of claim 15, wherein the indication of the set of PTRS resource densities to use for wireless communication of the PTRS includes an indication of a channel quality indicator (CQI) table.

21. The method of claim 15, further comprising:
    receiving an indication of at least one BLER associated with each set of PTRS resource density recommendations of the plurality of sets of PTRS resource density recommendations.

22. An apparatus configured for wireless communication, the apparatus comprising:
    a processing system that includes at least one processor and a memory coupled to the at least one processor, wherein the processing system is configured to cause the apparatus to:
    transmit an indication of one or more block error rates (BLERs);
    receive a plurality of sets of phase tracking reference signal (PTRS) resource density recommendations, the plurality of sets of PTRS resource density recommendations including:
        a first set of PTRS resource density recommendations that is determined to be sufficient to meet a first combination of BLER of the one or more BLERs and Doppler value of a plurality of Doppler values; and
        a second set of PTRS resource density recommendations that is determined to be sufficient to meet a second combination of BLER of the one or more BLERs and Doppler value of the plurality of Doppler values;
    transmit an indication of a set of PTRS resource densities to use for wireless communication of a PTRS based, at least in part, on a BLER of the one or more BLERs associated with the plurality of sets of PTRS resource density recommendations, wherein the plurality of sets of PTRS resource density recommendations includes the indicated set of PTRS resource densities; and
    at least one of receive or transmit the PTRS based, at least in part, on the set of PTRS resource densities.

23. The apparatus of claim 22, wherein the first set of PTRS resource density recommendations and the second set of PTRS resource density recommendations each includes at least one recommendation for each of a frequency density, a time density, and a sample density.

24. The apparatus of claim 22, wherein the processing system is further configured to cause the apparatus to transmit the indication of the set of PTRS resource densities to use for wireless communication of the PTRS based, at least in part, on a Doppler effect associated with the set of PTRS resource density recommendations, wherein a first Doppler value of the plurality of sets Doppler values the first set of PTRS resource density recommendations is determined to be sufficient to meet and a second Doppler value of the plurality of Doppler values the second set of PTRS resource density recommendations is determined to be sufficient to meet are different Doppler value indicative of different impacts of Doppler on the wireless communication.

25. The apparatus of claim 22, wherein the first set of PTRS resource density recommendations and the second set of PTRS resource density recommendations are determined to meet a same BLER of the one or more BLERs.

26. The apparatus of claim 22, wherein the processing system is further configured to cause the apparatus to receive an indication of specific PTRS resource densities to use for wireless communication of the PTRS, wherein the plurality of sets of PTRS resource density recommendations includes the indication of specific PTRS resource densities.

27. The apparatus of claim 22, wherein the indication of the set of PTRS resource densities to use for wireless communication of the PTRS includes an indication of a channel quality indicator (CQI) table.

28. The apparatus of claim 22, wherein the processing system is further configured to cause the apparatus to receive an indication of at least one BLER associated with each set of PTRS resource density recommendations of the plurality of sets of PTRS resource density recommendations.

* * * * *